July 6, 1926.
A. A. ICENHOUR
1,591,831
GLASS MAKING MACHINE
Filed Nov. 8, 1922
4 Sheets-Sheet 2
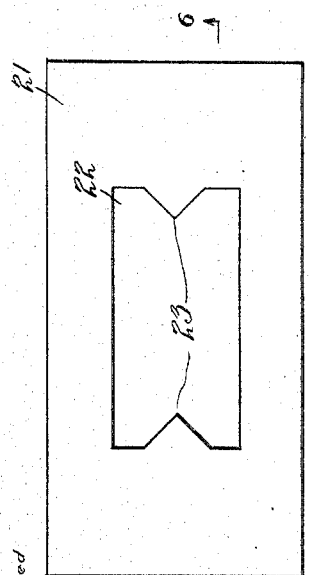
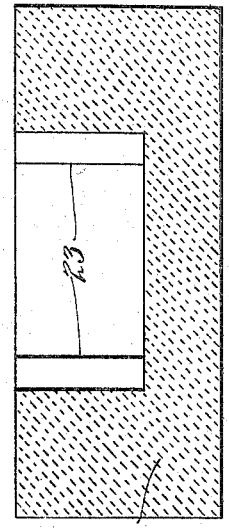
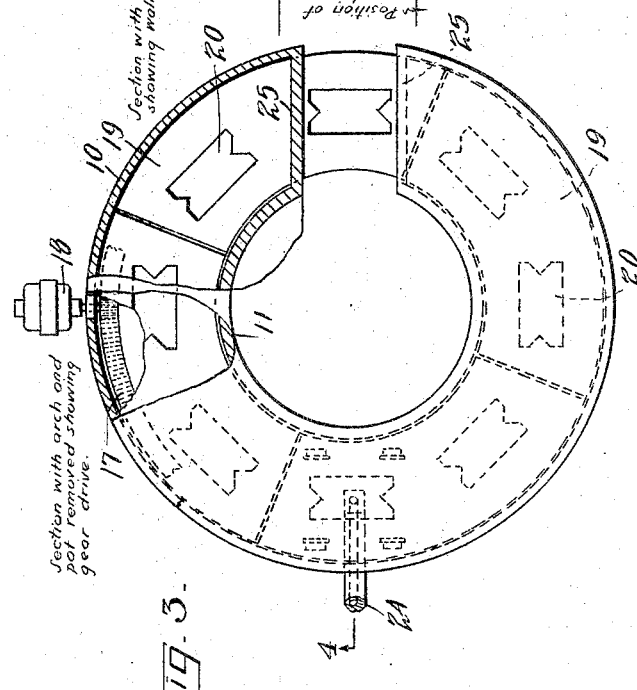
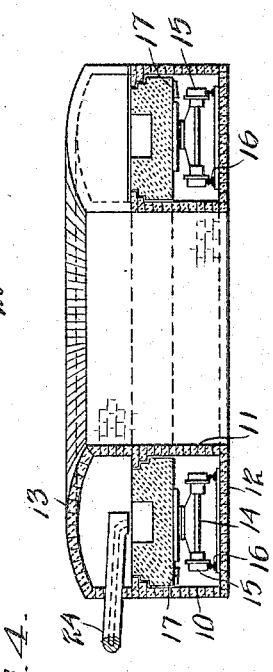
Inventor.
Albert A. Icenhour July 6, 1926.
A. A. ICENHOUR
1,591,831
GLASS MAKING MACHINE
Filed Nov. 8, 1922     4 Sheets-Sheet 3
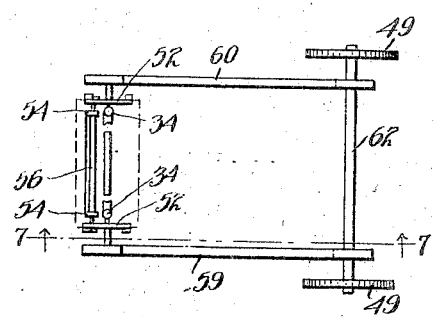
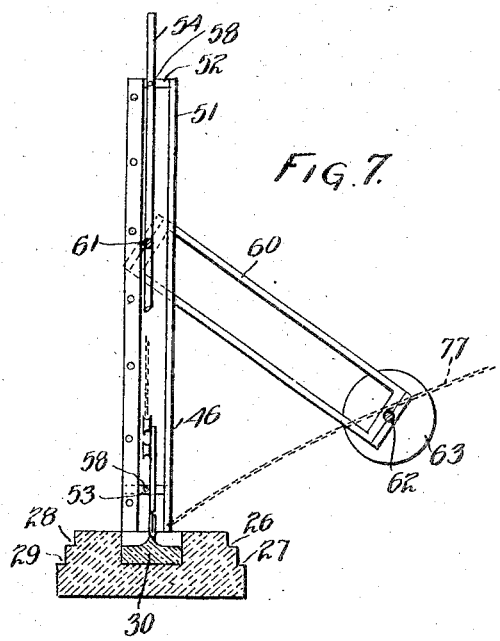
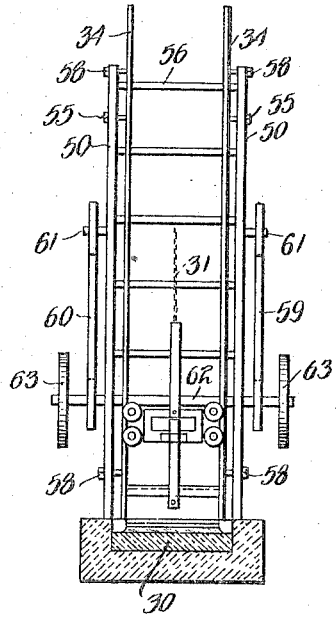
Inventor:
Albert A. Icenhour
Attorney

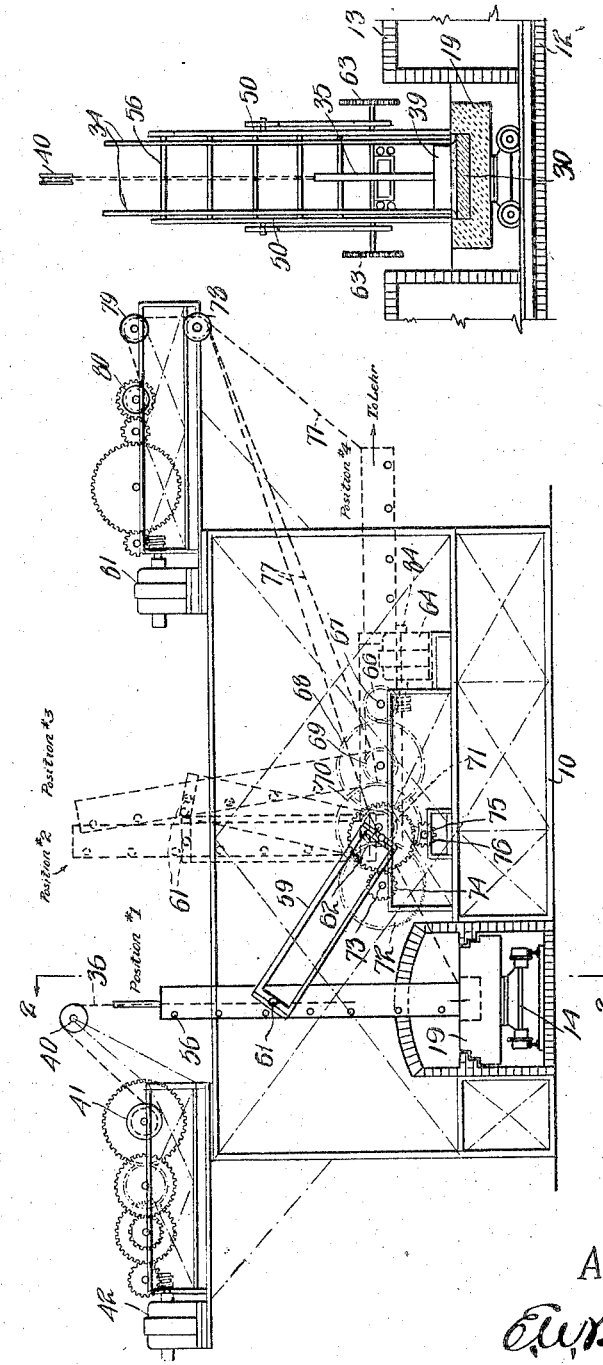

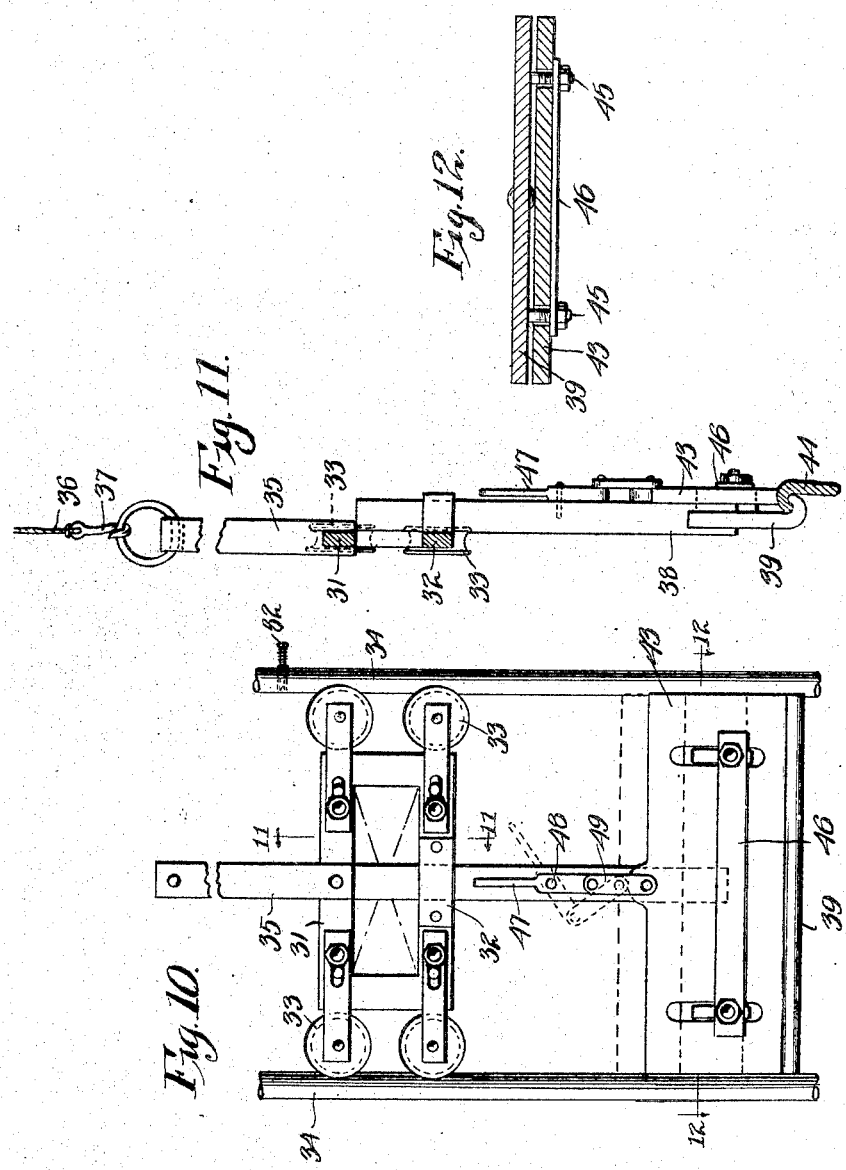

Patented July 6, 1926.

1,591,831

UNITED STATES PATENT OFFICE.

ALBERT A. ICENHOUR, OF DETROIT, MICHIGAN, ASSIGNOR TO HIMSELF, BENJAMIN F. NEUMANN, EMIL C. PATZER, AND WESLEY E. GARRISON, TRUSTEES, ALL OF DETROIT, MICHIGAN.

GLASS-MAKING MACHINE.

Application filed November 8, 1922. Serial No. 599,700.

My said invention relates to an improvement in machines for the manufacture of glass and involves also an improved method of glass making and a novel product made thereby. It is an object of the invention to eliminate the usual grinding and polishing process since the product of the machine of my invention is ready for use except for the usual annealing, cutting and trimming operations.

A further object of the invention is to eliminate the handling of pots since according to my process the pots do not need to be dumped to empty them either my inverting the pots or by the use of pots having an open bottom or otherwise.

A further object of the invention is to provide sheets of glass of any desired length, width and thickness at a greatly reduced cost, the cost of production being reduced approximately 75% over ordinary known methods. One of the main features of economy resides in the saving of labor since by the use of my invention twenty-four men working in three eight hour shifts are able to turn out work equivalent to that of three hundred and fifty men making plate glass according to the old style rolling and grinding process.

A further object of the invention is to provide as a product sheets of glass having a finished surface, i. e., the glass is transparent throughout and has a "skin" surface providing a perfect finish with a high natural polish as distinguished from the polish resulting from grinding and polishing.

Still another object is the provision of a pot or crucible of improved type. Other objects of invention and improvements in details of construction and the like will appear from the following specification:

Referring to the accompanying drawings which are made a part hereof and on which similar reference characters indicate similar parts, Figure 1 is a side elevation of my improved machine, with parts broken away and others shown diagrammatically for the sake of clearness, Figure 2, a fragmentary section on line 2—2 of Figure 1, Figure 3, a plan of the carrier for the pots and its housing, Figure 4, a section on line 4—4 of Figure 3, Figure 5, a plan on an enlarged scale of the improved pot used in my machine, this being of slightly modified form, Figure 6, a section on line 6—6 of Figure 5, Figure 7, a section on line 7—7 of Figure 9 with parts broken away.

Figure 8 is an elevation taken from the left-hand side of Figure 9, hereinafter referred to as the front of the machine, Figure 9, a plan of the parts shown in Figures 7 and 8, Figure 10, an elevation of the bait shown in Figure 8, the parts being turned through an angle of 90°, Figure 11 a section on line 11—11 of Figure 10, and Figure 12 a section on line 12—12 of Figure 10.

In the drawings reference character 10 indicates the outer wall of a closed housing having an inner wall 11, a floor 12 and a ceiling 13. Within the housing so formed there is provided an endless conveyor having trucks 14 which may be separate or connected in any desirable manner and are mounted on wheels 15, these wheels running on rails 16 forming an endless track. The conveyor carries teeth forming a rack 17 driven by a pinion on the shaft of a motor 18. The conveyor is adapted to carry a series of pots. In the form here shown the pots are formed as segmental blocks 19 to conform to the shape of the housing, and each block has a pair of openings 20, forming a twin pot. These segmental blocks are so formed for the sake of convenience in manufacture. In a preferred form of the invention a single circular block will be utilized, such block having the proper number of openings and being formed from refractory material, as usual. It will be understood that neither the specific form of conveyor nor the specific form of the pot is essential to my invention as the melted glass may be supplied by other devices than those shown in the drawings.

In the form shown in Figures 5 and 6 of the drawings each pot 21 is of rectangular form and is provided with a rectangular cavity at 22 having at its ends inward projections of the material of the pot shaped as reentrant angles 23. These angles, or the points thereof, which are or may be of the same material as the remainder of the pot are oppositely positioned with reference to the shape of the cavity for a purpose which will appear hereinafter. The shape of the cavity is not essential nor is it essential that the points 23 shall be at opposite ends or sides of the cavity but only that they be positioned oppositely with reference to each other so that a straight line can be drawn from one to the other. The various pots shown and described are such as I have found best adapted to my purpose but other forms will be found feasible and while pots of the forms described are very simple and therefore desirable for my purpose it will be found possible to operate with others of widely different character. At one side of the conveyor housing there is provided a feeding means 24 which may be of any desirable or conventional form, it being essential only that a proper supply of molten glass be furnished to each pot. In some cases it may be desirable to feed a batch of raw material to the pot and melt it in the same.

The enclosing housing has for its objects to retain the heat of the molten glass and the devices in the housing, and to prevent access of air currents to the surface of the glass. At a position herein shown as directly opposite the feeding position an opening is provided in the housing by means of which a single pot is exposed at a time. Vertical walls 25 are provided at opposite sides of the opening to shut off the spaces in the housing from the outer air so far as feasible. By reference to Figures 1, 4 and 7 it will be noted that the pots at the upper edges of their longitudinal sides are provided with steps or ledges 26, 27, 28 and 29 which cooperate with complementary steps or ledges on the housing to assist in holding the heat in the pots and to limit the access of air to such an amount as will suffice to maintain good combustion in the upper part of the housing. Heat may be supplied to the housing in any conventional or desired manner. The body of molten glass is indicated at 30.

In the practice of my invention it is preferable to provide in each pot only so much glass as will suffice for the drawing of a single sheet, or rather a little more than such amount since it is not practicable to draw all of the glass out of the pot into a sheet of glass and this is the reason why I prefer to utilize a number of small pots, it being possible also to draw from an endless stream of molten glass or from a large mass of the same though perhaps with less desirable results. By using small pots in a protecting housing the glass that remains in the pot does not cool to an excessive extent and so will merge into the next batch fed when the pot again reaches charging position.

For the purpose of drawing the glass in the pot I have provided a single cold bait which is shown in detail in Figures 10 to 12 and to which the glass will not adhere thus making it unnecessary to provide additional baits or to require labor to clean off the bait. This bait comprises a truck consisting of cross-bars 31 and 32 and adjustably mounted rollers 33 at opposite ends of the cross-bars, these rollers being adapted to run on a pair of opposed rails 34. The truck carries a bar 35 adapted to be connected at one end to a cable 36 by a quick-releasing hook 37 and carrying at the other end a support 38 for a fixed hook-shaped jaw 39. The cable 36 passes over a pulley 40 and thence to a drum 41 operated by a train of gearing from a motor 42 to raise and lower the bait. A movable jaw 43 is located in position to cooperate with the fixed jaw, the fixed jaw being lowered into the molten glass and forming a hook-shaped freeze as indicated at 44 in Figure 11 and the movable jaw being then caused to clamp down on the "freeze" or lip of partially solidified glass to prevent the same from slipping off in drawing the sheet from the pot. The jaws are held in slidable relation to each other by bolts 45 on the fixed jaw passing through the movable jaw and also through a spacer bar 46 at the front side of the movable jaw. For operating the movable jaw I have shown a handle 47 pivoted at 48 and pivotally connected at the other end to a link 49 which is also pivotally connected to the movable jaw. In the full line position of Figure 10 it will be seen that the jaws are closed, whereas in the dotted line position they are open.

A movable frame is adapted to be positioned on the pot exposed by the opening in the housing (Fig. 2). Said frame is of skeleton construction having at each side spaced uprights 50 and 51 connected by crosspieces 52 and 53. Uprights 54 are secured to members 50 by bolts 55 and carry a plurality of rollers 56 covered with asbestos. Guide rails 34 are secured to the uprights in any convenient manner, and as here shown may be attached to the crosspieces by bolts 58, these rails forming guides for the rollers on the truck of the bait.

A pair of rockarms 59 and 60 are each pivoted at one end to stubshafts 61 projecting from opposite sides of the ladder-like frame and at their other ends are rigidly secured to a shaft 62 having at its opposite ends gears 63 by which it is driven. The drive for this purpose is from a motor 64 through a worm 65 and worm gear 66 to a shaft 67, at the far side of the machine in Figure 1. This shaft has a pinion driving a gear 68 which is on the same shaft with pinion 69 meshing with a gear 70 fixed to a pinion 71 which through gear 72 drives shaft 73. The shaft 73 carries near opposite ends pinions 74 meshing with gears 63. Beneath the shaft 62 is a shaft 75 carrying at opposite ends pinions 76 meshing with gears 63 and serving to hold shaft 62 in proper alinement with the machine frame. A cable 77 as shown in different positions in Figures 1 and 7 is attached to the lower end of the movable frame and passes over shaft 62 about a series of loose pulleys 78 and 79 to a drum 80 driven by a train of gearing from a motor 81.

In the operation of my machine a succession of masses of molten glass are carried to the drawing position the bait is lowered to enter the fixed jaw into the mass and here forms a hook-shaped freeze of solidified partly-cooled glass due to the relatively cold hook of the bait. The movable jaw is then lowered so that the lip of the "freeze" of glass is caught between the jaws as shown in Figure 11. It is to be understood that the bait is lowered so as to extend across the cavity of the pot in line with the points 23. Should a pot rock on its vertical axis or something else occur to prevent such positioning, the frame must be moved by hand or by appropriate mechanism to restore the alinement. The bait is normally guided by the side rails so that the jaws are alined directly with the points 23 and after forming the "freeze" the bait is retracted to draw a sheet of glass in upward direction. The points 23 are known as cold points, they having the lowest temperature of any part of the wall of the glass-holding chamber and as soon as such movement begins the glass will adhere to the points while the remainder of the glass in the pot will draw apparently with absolute uniformity upward into a sheet and this sheet will be formed without wrinkle or flaw, transparent and with a perfectly smooth surface having an extremely high natural polish, such as I prefer to call a silver fire polish. When the sheet has been drawn of sufficient height the carriage will be engaged by detents 82 to prevent retrograde movement and the sheet will be severed from the glass remaining in the pot and the cable unhooked at 37. The motor 64 will now be started to revolve the shaft 62 thereby moving the rock-arms 59 and 60 with the framework carried thereby, the bait and the sheet of glass into position 2 (Fig. 1), this being due to the connection of the rock-arms to the frame. The cable 77 which is now wound up on the drum 80 by the motor 81 and this action combined with that of the rock-arms causes the frame to move on through position 3 etc. until it is finally arrested in the horizontal position 4 in Figure 1 by stops 84 and from this position the sheet of glass can be moved in any desired way into the lehr. The sheet of glass while being raised by the bait is very close to the rollers 56 (in practice about ¼ inch from them) so that it strikes very gently against them as the frame starts to swing and the soft asbestos covering prevents any danger of scratching or marring its surface. At the same time it will not be burned by contact with the hot glass.

It appears that the perfect surface of the glass in my product is partly due to such construction of the rollers though other factors such as the absence of any bending during the process of manufacture are also important, the main factor however being that during the entire formative period while the glass is changing from a plastic to a solid condition no extraneous object or foreign substance contacts with the glass save for the bait itself. After the sheet is moved into the lehr the swinging frame is again raised by reversing the motion of the rocker-arm 59 and letting off the cable 77, this resulting in the movement of the frame and the rockarms into a series of positions the reverse of those indicated in Figure 1.

It will be evident to those skilled in the art that numerous changes may be made in my device without departing from the spirit of the invention. For example the shape of the pot may be varied. In the structure shown the opposed points and the bait divide the mass of glass into two approximately symmetrical portions. This is a contributing factor to the perfection of the product in that the contained heat at each side of the line between the points will be substantially equal as well as the quantity of glass and all the other factors entering into the drawing process. It will be evident, however, that two such opposed points can be erected in a container of other form which need not be symmetrical since by directly varying the heat according to location of the points the disturbing influence of unsymmetrical shape may be compensated and similarly with other factors entering into the process.

It will be obvious that an endless succession of the pots is not essential since the method can be carried out with a single pot or an endless sheet of glass might be formed from an unfailing supply. Other materials than asbestos may be found satisfactory for use on the roller, or as rollers, and in general I do not limit myself to the specific devices shown and described, but only as indicated in the appended claims.

Having thus fully described my said invention, what I claim as new and desire to secure by Letters Patent, is:

1. In a glass machine, a bait, means to lift the same to draw a sheet of glass, and a swingable support having asbestos covered rollers to receive the sheet and position it for entrance to the lehr, substantially as set forth.

2. In a glass machine, a normally upright frame, a bait movable up and down on the frame to draw a sheet of glass, means on the frame to hold the bait in elevated position, means for lowering the frame with the sheet of glass into horizontal position, and means on the frame to support said sheet of glass in the latter position, substantially as set forth.

3. In a glass machine, a frame, a bait movable up and down on the frame to draw a sheet of glass from a supply of molten glass said sheet being free of contact with extraneous bodies prior to solidification, and means to move the frame thereafter into position to support said sheet for entrance into the lehr, substantially as set forth.

4. In a glass machine, a frame, a bait movable up and down on the frame to draw a sheet of glass from a supply of molten glass said sheet being free of contact with extraneous bodies prior to solidification, means to move the frame away from the source of supply and means to move the frame thereafter into contact with the glass and then into horizontal supporting position, substantially as set forth.

5. In a glass machine, a frame, a bait movable up and down on the frame to draw a sheet of glass from a supply of molten glass said sheet being free of contact with extraneous bodies prior to solidification, means to move the frame thereafter into position to support said sheet for entrance into the lehr, and means to return the frame to upright position when the sheet has been removed, substantially as set forth.

6. A glass machine comprising a vertically movable bait, a carrier for bringing pots of molten glass into operative position relatively to said bait, and a housing covering the pots not occupying such position said pots having stepped recesses deepest at the top of the pot, and flanges of different width on the housing engaging said recesses in the pots to protect their contents from currents of relatively cold air, substantially as set forth.

7. In a glass making machine, a bait for drawing a sheet of glass, a frame having vertical guiding means for the bait, means on the frame for supporting the bait in elevated position, means for swinging the lower end of the frame toward the front of the machine to place the frame in horizontal position, and means on the frame adapted to engage a face of said sheet for supporting the sheet of glass in such position, substantially as set forth.

8. In a glass making machine, a bait for drawing a sheet of glass, a frame having vertical guiding means for the bait, means on the frame for supporting the bait in elevated position, a transverse shaft in advance of the frame, rockarms on the shaft pivotally secured to opposite sides of the frame, means for moving the shaft to swing the frame toward the front of the machine, means for swinging the frame on its pivotal support into horizontal position as it approaches the front of the machine, and means on the frame for supporting the sheet of glass during the swinging movement substantially as set forth.

9. In a glass making machine, a bait, a frame having vertical guiding means for the bait, means on the frame for supporting the bait in elevated position, a transverse shaft in advance of the frame, rockarms on the shaft pivotally secured to opposite sides of the frame, means for moving the shaft to swing the frame toward the front of the machine, a cable attached to the lower end of the frame and means for winding up the cable to swing the frame toward horizontal position as it moves toward the front of the machine, substantially as set forth.

10. In a glass making machine, a bait, a frame having vertical guiding means for the bait, means on the frame for supporting the bait in elevated position, a transverse shaft in advance of the frame, rockarms on the shaft pivotally secured to opposite sides of the frame, means for moving the shaft to swing the frame toward the front of the machine said means also serving to move the shaft in the opposite direction to return the frame to drawing position over a molten mass of glass, substantially as set forth.

11. In a glass making machine, a closed housing having inwardly projecting stepped flanges, and a pot adapted to travel in said housing said pot having stepped flanges cooperating with those on the housing to limit the access of air to the upper part of the housing, substantially as set forth.

12. In a glass making machine, a bait, a framework having vertical guiding means for said bait, releasable means for elevating the bait and means for sustaining said bait in elevated position after the elevating means is released, substantially as set forth.

13. In a glass making machine, a bait, a framework having vertical guiding means for said bait, and spring-pressed detents on the framework adapted to engage the bait for sustaining the same in elevated position, substantially as set forth.

14. In a glass making machine, a bait, a framework having vertical guiding means for the bait, said guiding means adapted to be swung into a horizontal position and a series of rollers closely adjacent to the sheet of glass as drawn for sustaining the glass in the horizontal position of the guiding means, substantially as set forth.

15. In a glass making machine, a bait, a framework having vertical guiding means for the bait, said framework adapted to be moved into horizontal position, a cable detachably connected to the bait, means for winding and unwinding the cable to raise and lower the bait, means to move the frame from upright to recumbent position and back again independently of said cable, means on the frame for sustaining the bait in elevated position and means closely adjacent to the glass in elevated position of the bait for sustaining the same when the framework is moved into horizontal position, substantially as set forth.

16. In a glass machine, a frame, a bait movable up and down relatively to the frame to draw a sheet of glass from a supply of molten glass the face of said sheet being free of contact with extraneous bodies prior to the solidification, and means for moving the frame into position to support the sheet for entrance into the lehr, substantially as set forth.

In witness whereof, I have hereunto set my hand and seal at Washington, District of Columbia, this seventh day of November, A. D. nineteen hundred and twenty-two.

ALBERT A. ICENHOUR. [L. S.]